Dec. 22, 1964     N. E. NOYES     3,162,257
BARREL-TYPE SOIL AUGER
Filed Oct. 12, 1962

INVENTOR
NEWTON E. NOYES

BY Ernest S. Cohen
Gersten Sadowsky
ATTORNEYS 3,162,257
BARREL-TYPE SOIL AUGER
Newton E. Noyes, Grand Junction, Colo.
Filed Oct. 12, 1962, Ser. No. 230,298
3 Claims. (Cl. 175—403)
(Granted under Title 35, U.S. Code (1952), sec. 266)

The invention herein described and claimed may be manufactured and used by or for the Government of the United States of America for governmental purposes without the payment of royalties thereon or therefor.

The invention relates to a soil auger for obtaining soil samples, and more particularly to a hand or power operated barrel-type soil auger for obtaining soil samples in an expeditious and improved manner.

Soil augers heretofore employed for obtaining soil samples have not proved to be satisfactory in various types of soil structures encountered. Ordinary post hole augers are designed primarily for digging holes rather than obtaining a sample of undisturbed material for sampling purposes. Such augers usually mix the earth materials and destroy the natural soil structure. Other soil augers specifically designed for removing soil samples have a cutting tooth structure that generally limits their use to moist coherent soils only.

It is an object of this invention to provide an improved soil auger which can effectively operate to remove soil samples in wet or dry materials ranging from dense clays to loose incoherent sands and coarse gravel.

It is a further object of this invention to provide a barrel-type soil auger with curved and cupped teeth resembling plowshares having warped surfaces.

Figure 1:
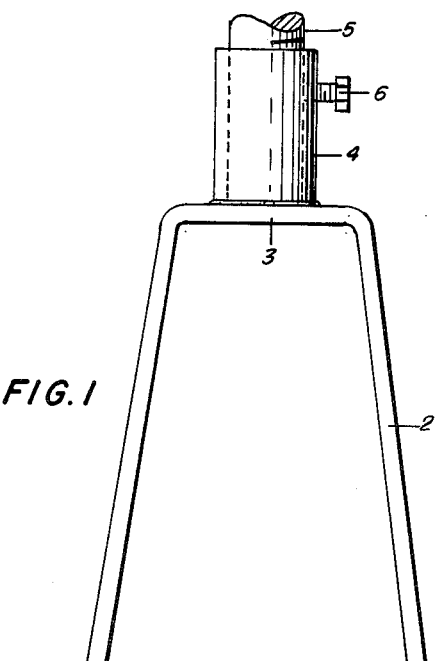
Figure 2:
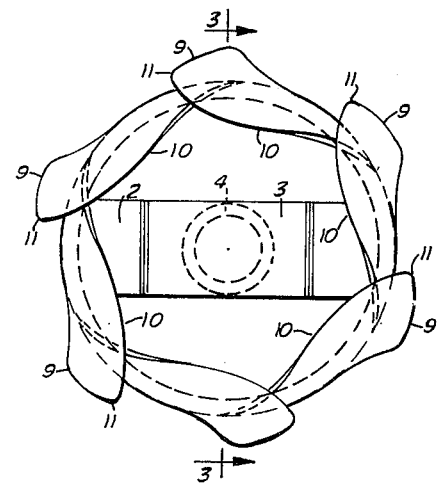
Figure 3:
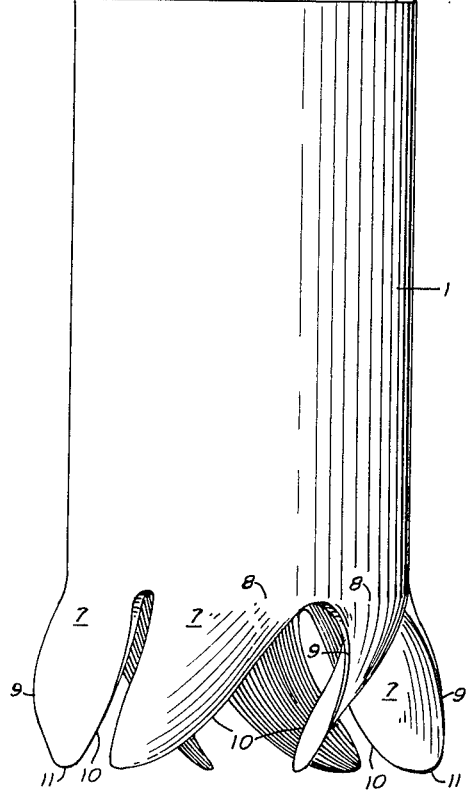
Figure 3:
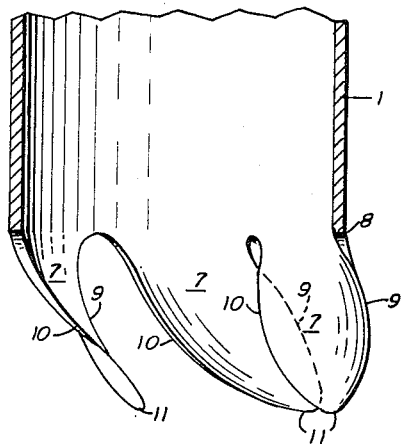

Further objects of my invention will become more readily apparent from a study of the following drawings and the accompanying specification, wherein:

FIG. 1 is a side elevation of the barrel-type soil auger.
FIG. 2 is a bottom view of the device looking upward.
FIG. 3 is a sectional view taken along line 3—3 of FIG. 2.

In the figures, 1 is a cylinder or barrel made of mild steel or other suitable metal. A yoke 2 having a straight upper shoulder 3 is fastened as by welding or riveting to cylinder 1 at diametrically opposed locations. An internally threaded nipple 4 is welded or otherwise securely joined to shoulder 3. Threaded rod 5 is screwed into nipple 4, and is restrained from becoming loosened by set screw 6. Rod 5 has at its upper end a handle or crossbar (not shown) for convenience in manipulating the tool. Alternatively, rod 5 may be connected to a power take-off if desired for power operation.

At the bottom of cylinder 1 are located cutting teeth 7 which cut and penetrate into the soil. Each tooth as shown best in FIG. 1, has a generally triangular shape and has a base portion 8, a leading edge 9, a trailing edge 10, and an apex 11. The leading edge 9 extends downwardly as shown, in a generally longitudinal direction. The leading edge, which is sharpened, is curved. This is best shown in the left hand teeth in FIGS. 1 and 3, where it is seen they are convex when viewed from the outside of cylinder 1, and protrude a short distance beyond the cylinder surface. Also made evident in FIG. 1, by the teeth shown on the right hand side, is that the trailing edge 10 of each tooth is curved inwardly a substantial distance beyond the surface of the cylinder toward the axis thereof. The effect of the curvatures of the leading edge 9 and trailing edge 10 is to make the surface of the tooth warped or cupped, whereby each tooth acts as a plowshare when the soil auger as shown in FIG. 1, is rotated in a clockwise direction.

The effect of this plowshare-like action causes soil to be scooped into the cylinder and compressed somewhat. The shape of the teeth enables the soil auger to penetrate rapidly and easily into soil strata because of the somewhat helicoidal shape of the surface, resulting in a screw effect on rotation. Loose, dry and incoherent material are retained in the cylinder or barrel when the auger is lifted from the soil, due to the cupped shape of the teeth. Since the over-all diameter of the teeth is somewhat larger than the auger barrel, easy lifting of the tool and the soil contents is facilitated.

The teeth may be made by cutting them out on a suitable piece of mild steel tubing, then bending them to the proper shape, sharpening the leading edge and hard-facing it. Alternatively, the teeth may be cut out on a sheet of suitable steel as a development layout, and then welding the teeth to a length of steel tubing.

While six teeth have been shown in the embodiment depicted in the figures, it is to be understood that the number may be varied to suit any particular requirement. The angle of the leading edge with respect to the cylinder axis may be varied so that instead of being generally parallel thereto, it may form an acute or obtuse angle therewith. Other changes may be made within the spirit of the invention as will be apparent to those skilled in the art.

What is claimed is:
1. A soil auger for obtaining soil samples comprising, a cylinder,
a plurality of cutting teeth at one end of said cylinder, each tooth being generally triangular in shape and having a base, a sharpened leading edge, a trailing edge and an apex,
the base of the tooth having a curvature equal to that of the surface of the cylinder, said base being integral with the said end of the cylinder,
the apex of the tooth being spaced from the base of the tooth, in a direction generally longitudinal from the said end of the cylinder and approximately aligned with the surface thereof,
the leading edge being curved so as to be convex when viewed from the exterior of the cylinder so that at its upper portion the said leading edge protrudes outwardly away from the cylinder surface a short distance and the trailing edge being curved so that a substantial portion thereof protrudes inwardly away from said cylinder surface,
whereby the surface of the tooth is warped and has a cupped shape,
and means fastened to the other end of the cylinder for revolving and forcing the teeth into the soil.
2. A soil auger as in claim 1 wherein the teeth are spaced on the cylinder so as to have the bases of the teeth contiguous.
3. A soil auger as in claim 1 wherein the leading edge is disposed in a direction generally parallel to the cylinder axis.

References Cited by the Examiner
UNITED STATES PATENTS

| | | | |
|---|---|---|---|
| 616,928 | 1/99 | Isgrig et al. | 175—421 X |
| 633,574 | 9/99 | Densmore | 175—421 X |
| 882,475 | 3/08 | Martin | 175—404 |
| 1,733,241 | 10/29 | Scott | 175—411 X |
| 2,159,249 | 5/39 | Brantly | 175—421 X |

CHARLES E. O'CONNELL, Primary Examiner.
BENJAMIN BENDETT, Examiner.